United States Patent
Marque-Pucheu

(10) Patent No.: US 7,764,633 B2
(45) Date of Patent: Jul. 27, 2010

(54) METHOD AND APPARATUSES FOR MANAGING TWO-WAY ALTERNATE COMMUNICATION IN SEMI-DUPLEX MODE THROUGH A PACKET SWITCHING TRANSPORT NETWORK

(75) Inventor: Gérard Marque-Pucheu, Verneuil (FR)

(73) Assignee: Eads Secure Networks, Montigny le Bretonneux (FR)

( * ) Notice: Subject to any disclaimer, the term of this patent is extended or adjusted under 35 U.S.C. 154(b) by 1307 days.

(21) Appl. No.: 10/473,564

(22) PCT Filed: Mar. 26, 2002

(86) PCT No.: PCT/FR02/01037

§ 371 (c)(1),
(2), (4) Date: Sep. 29, 2003

(87) PCT Pub. No.: WO02/080596

PCT Pub. Date: Oct. 10, 2002

(65) Prior Publication Data

US 2004/0100987 A1 May 27, 2004

(30) Foreign Application Priority Data

Mar. 29, 2001 (FR) .................................. 01 04241

(51) Int. Cl.
*H04B 7/14* (2006.01)
(52) U.S. Cl. .................. 370/279; 370/261; 370/389; 370/465; 455/90.2; 455/518
(58) Field of Classification Search ................ 370/279, 370/260, 261, 266, 263, 276, 351, 352, 389, 370/465, 444; 455/90.2, 518
See application file for complete search history.

(56) References Cited

U.S. PATENT DOCUMENTS 5,170,490 A * 12/1992 Cannon et al. ................ 455/72
5,517,681 A * 5/1996 Talarmo ..................... 455/517

(Continued)

FOREIGN PATENT DOCUMENTS

WO      WO 9916266        4/1999

(Continued)

OTHER PUBLICATIONS

Schulzrinne H et al.:"Signaling for Internet telephony", Proceedings of the International Conference on Network Protocols, XX, XX, Oct. 13, 1998, pp. 298-307.

(Continued)

*Primary Examiner*—Ricky Ngo
*Assistant Examiner*—Luat Phung
(74) *Attorney, Agent, or Firm*—McCracken & Frank LLP

(57) ABSTRACT

A method for managing two-way alternate communication in half-duplex mode between at least two end equipments of a packet switching transport network in non-connected mode, provides that an indicating element serves, when it is present with a first given value in the packets transmitted from one of said end equipments to a central equipment managing the communication, to indicate to said central equipment that said end equipment acknowledges receipt of the right to send which is granted to it by said central equipment and that it requests the maintaining of said right to send.

17 Claims, 7 Drawing Sheets

U.S. PATENT DOCUMENTS

| | | | |
|---|---|---|---|
| 5,734,643 A | 3/1998 | Rondeau | 370/279 |
| 6,301,263 B1 * | 10/2001 | Maggenti | 370/462 |
| 6,366,771 B1 * | 4/2002 | Angle et al. | 455/414.1 |
| 6,928,294 B2 * | 8/2005 | Maggenti et al. | 455/518 |
| 6,930,994 B1 * | 8/2005 | Stubbs | 370/348 |
| 7,170,887 B2 * | 1/2007 | Rosenberg | 370/352 |
| 2006/0039363 A1 * | 2/2006 | Gummalla et al. | 370/352 |

FOREIGN PATENT DOCUMENTS

| | | |
|---|---|---|
| WO | WO 9963773 | 12/1999 |
| WO | WO 0167787 | 9/2001 |

OTHER PUBLICATIONS

Postel J. "Internet Protocol", RFC 791, IETF Sep. 1981.
Schulzrinnz H., "RTP: a transport protocol for real-time applications", RFC 1889, IETF, Jan. 1996.
Handley M. et al, "SIP: Session Initiation Protocol", RFC 2543, IETF, Mar. 1999.
Handley M. et al, "SDP: Session Description Protocol", RFC 2327, IETF, Apr. 1998.
Postel J., "User Datagram Protocol", RFC 768, IEFT, Aug. 1980.
International Search Report dated Jul. 18, 2002, Application No. PCT/FR02/01037.

* cited by examiner

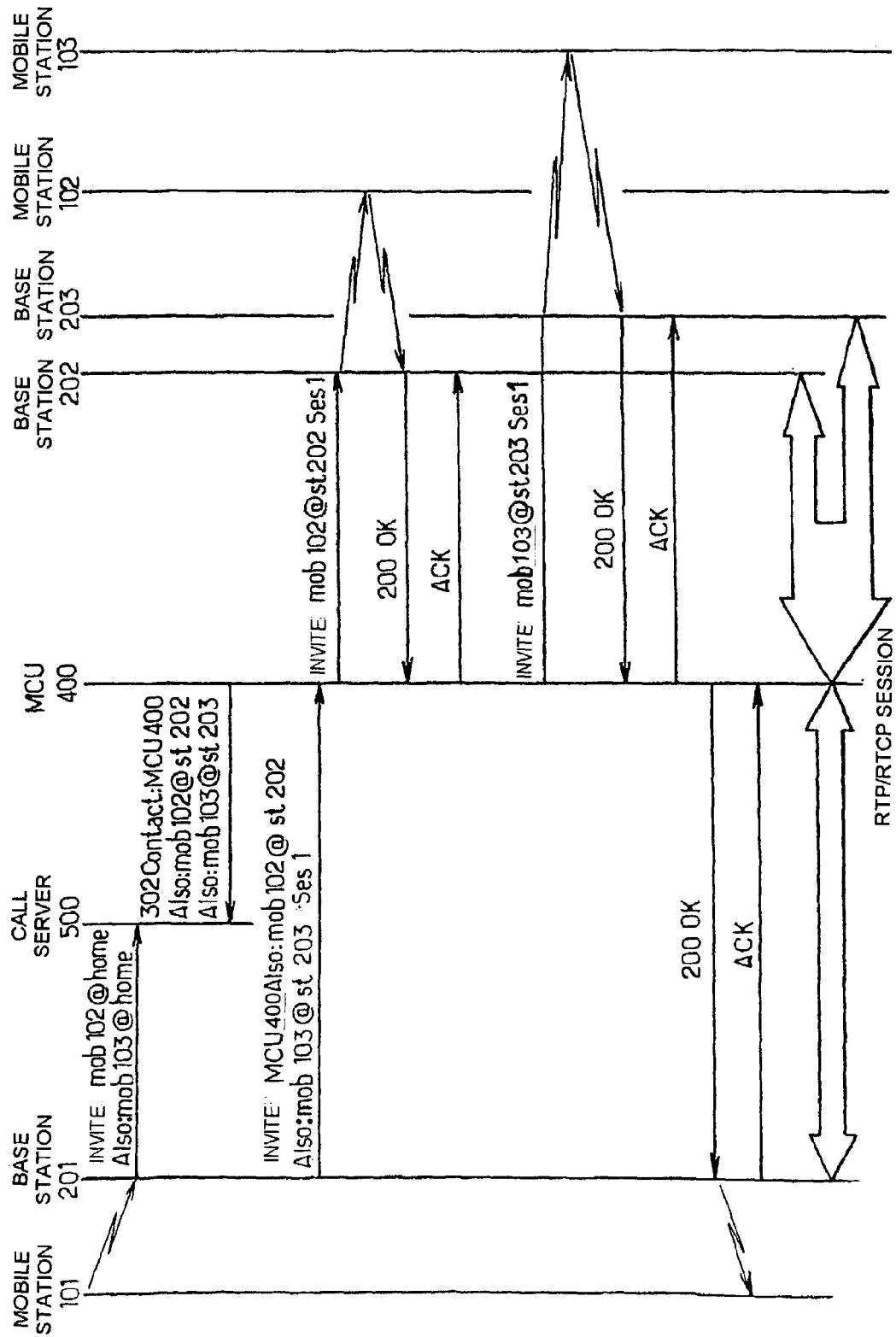

FIG.6. (PRIOR ART)

| V=2 | P | X | CC | M | PT | SEQUENCE NUMBER |
|---|---|---|---|---|---|---|
| TIMESTAMP ||||||||
| SYNCHRONIZATION SOURCE IDENTIFIER (SSRC) ||||||||
| CONTRIBUTING SOURCE IDENTIFIERS (CSRC) ||||||||
| ../.. ||||||||

FIG.7. (PRIOR ART)

| NF | C | P | E | PRIO | SOURCE ADDRESS |
|---|---|---|---|---|---|
| SPEECH FRAMES ||||||
| ALGORITHM ID | KEY IDENTIFIER |||||
| ../.. ||||||

METHOD AND APPARATUSES FOR MANAGING TWO-WAY ALTERNATE COMMUNICATION IN SEMI-DUPLEX MODE THROUGH A PACKET SWITCHING TRANSPORT NETWORK

TECHNICAL FIELD

The present invention relates to a method for managing a group communication in half-duplex mode between various end equipments of a packet switching network.

It concerns the field of packet switching transport networks in non connected mode, in particular IP (Internet Protocol) networks.

It finds applications, in particular in radiocommunications systems, especially private systems for professional radiocommunications, such as those intended for the police or fire departments.

BACKGROUND OF THE INVENTION

These systems have a particular mode of communication, the so-called half-duplex mode, which has long since disappeared from public systems (public switched telephone network, or public radiocommunications systems such as GSM). In the half-duplex mode, a mobile station can send or receive, but cannot perform both these operations at once (i.e., push-to-talk functions or emit/receive function). Moreover, a single mobile station must be authorized to send at a given instant, the data flow sent by this mobile station being retransmitted to the mobile station or stations participating in the communication (also called a call), that is to the mobile station concerned when dealing with an individual communication or to all the mobile stations participating in the communication when dealing with a group communication.

A particular network equipment, called the central equipment in what follows, performs arbitration in case of conflict between requests for the right to send reaching it from different mobile stations through corresponding base stations. This arbitration is based on a level of priority and/or on the identity of the mobile stations. The central equipment notifies the various mobile stations of the result of this arbitration, that is it indicates the mobile station to which the right to send has been granted. It must also, as the case may be, warn the other mobile stations of the end of the alternation (i.e., press-to-talk time period, or emit/receive time period) in progress, that is of the cessation of sending by the mobile station which had previously obtained the right to send, so that these other mobile stations can in their turn request the right to send. It must also, as the case may be, allow the preemption of alternation by a mobile station having a higher priority than that which enjoys the right to send for the alternation in progress.

The major development of packet switching transport networks in non connected mode makes it possible to envisage the management of a communication between at least two base stations of a radiocommunications system that are regarded as end equipments of such a network.

In particular, use may be made of the mechanisms of the multimedia conferences defined within the framework of internet protocols, that is protocols for networks operating according to the IP protocol (J. Postel, "Internet Protocol", RFC 791, IETF, September 1981) which has been standardized by the IETF ("Internet Engineering Task Force") organization in the above RFC (Request For Comments). These multimedia conferences are based on the implementation of a multimedia video conferencing equipment or MCU (standing for "Multimedia Conferencing Unit"), and offer an advantageous support for producing numerous types of telephony and videophony services for example. However, the principal internet protocols have been designed for conventional multimedia applications and do not take account of the specific features of certain applications of professional radiocommunications networks, and in particular the management of alternation for communications in half-duplex mode.

It is therefore seen to be desirable to adapt the protocols implemented in packet switching transport networks in non connected mode, for allowing the management of alternation for communications in half-duplex mode, be they individual communications or group communications.

SUMMARY OF THE INVENTION

This aim is attained by virtue of a method for managing two-way alternate communication in half-duplex mode between at least two end equipments of a packet switching transport network in non connected mode, wherein an indication element has as function, when it is present with a first given value in packets transmitted from one of said end equipments to a central equipment undertaking the management of the communication, to indicate to said central equipment, on the one hand, that said end equipment acknowledges receipt of the right to send that is granted to it by said central equipment and, on the other hand, that it is requesting the maintaining of this right to send.

This indication element may moreover have as function, when it is present with a second given value in packets transmitted by the central equipment to the end equipments, to indicate to said end equipments that they may request the right to send.

When the packet switching transport network in non connected mode is an IP network, the central equipment may be an MCU, and the frames transmitted over the network may be RTP packets (standing for "Real time Transport Protocol", see H. Schulzrinne, "RTP: a Transport Protocol for Real-Time Applications", RFC 1889, IETF, January 1996), the communication then being set up as an RTP/RTCP session (standing for "Real Time Transport Control Protocol").

According to an advantageous characteristic of the invention, the indication element may then be the marking bit M of the header of the RTP packets, said first value of the indication element being the logic value 1 or 0, and said second value of the indication element being the logic value 0 or 1, respectively.

The invention also proposes the application of the method hereinabove to a radiocommunications system, in particular a private system for professional radiocommunications. The method then allows the management of alternation for individual communications or group communications between mobile stations when at least certain of the end equipments of the packet switching transport network are also base stations of said radiocommunications system.

The invention also proposes a radiocommunications system, in particular a private system for professional radiocommunications, comprising base stations and a network equipment that are linked by a packet switching transport network in non connected mode, wherein said base stations comprise means for the implementation of the method as network end equipment and wherein said network equipment comprises means for the implementation of the method as central equipment.

The invention further proposes a base station intended for use as end equipment in a system as defined hereinabove.

The invention finally proposes a multimedia videoconferencing equipment intended to be used as central equipment in a system as defined hereinabove.

Other characteristics and advantages of the invention will become further apparent on reading the following description. The latter is purely illustrative and should be read in conjunction with the appended drawings wherein are represented:

BRIEF DESCRIPTION OF THE DRAWINGS

FIG. 4 is a chart presenting a set up protocol for establishing a group communication involving three base stations of a system according to FIG. 1;

FIG. 6 is a chart illustrating the format of the header of an RTP packet;

FIG. 7 is a chart illustrating the format of the payload of an RTP packet;

Figure 1:
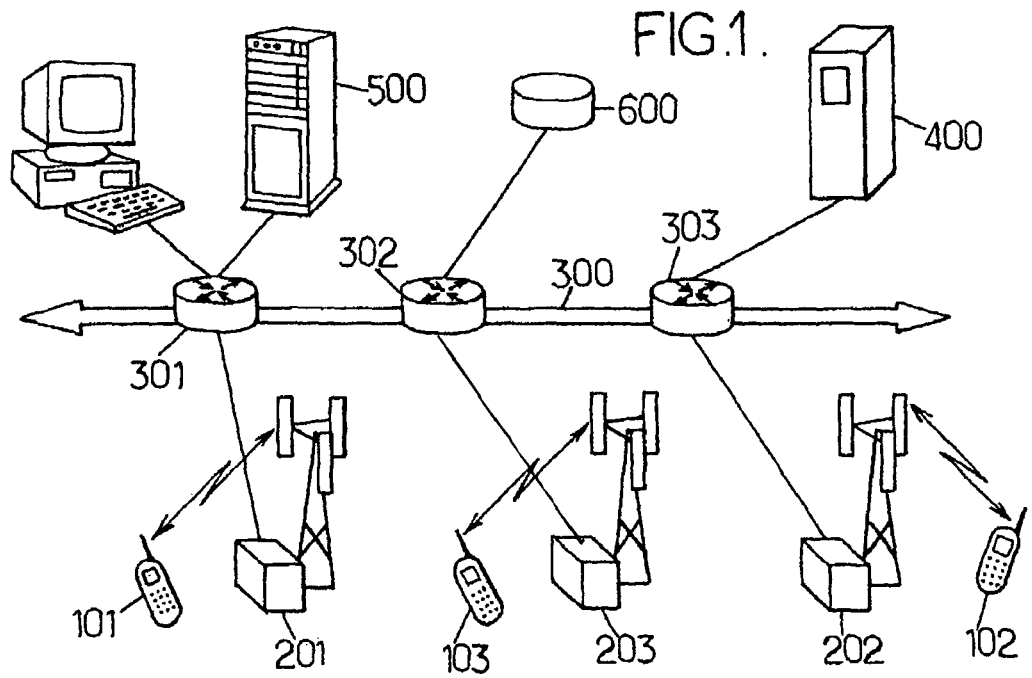
FIG. 1 is the diagram of a radiocommunications system according to the invention.

Represented diagrammatically in FIG. 1 is a radiocommunications system according to the invention.

DESCRIPTION OF PREFERRED EMBODIMENTS

In the example represented, mobile stations 101, 102 and 103 are in the zone of coverage of base stations 201, 202 and 203 respectively. It is recalled that the base stations are fixed equipments of the radio subsystem of the radiocommunications system, which undertake the radio interface with the mobile stations.

The base stations are attached to a packet switching transport network in non connected mode 300, such as an IP network. Stated otherwise, the base stations 201, 202 and 203 are also end equipments of an IP network. Packet switching is effected by routers 301, 302 and 303.

A network equipment 400 is attached to the network 300. It is preferably an MCU, the customary function of which consists in grouping together or in switching several real time data streams (for example, a data stream for voice and/or a data stream for video) so as to construct a stream distributed to several receivers, producing a multimedia conferencing configuration.

A call server 500 is also attached to the network 300. This equipment analyzes calls and sets up multimedia communications on the network 300. It cooperates with a location database 600, which is also attached to the network 300, and which contains information indicating, among other things, the cell under whose coverage the mobile station called is situated, thus allowing correct routing of the calls.

Equipments other than those represented in FIG. 1 may naturally form part of the radiocommunication system. These equipments not participating in the mechanisms of the method according to the invention, it is unnecessary to describe them here. Furthermore, the various equipments (base stations, MCU, call server, etc.), although represented here in the form of distinct physical entities for clarity of the account, may be duplicated, joined or dispersed in various ways without departing from the framework of the invention.

Figure 2:
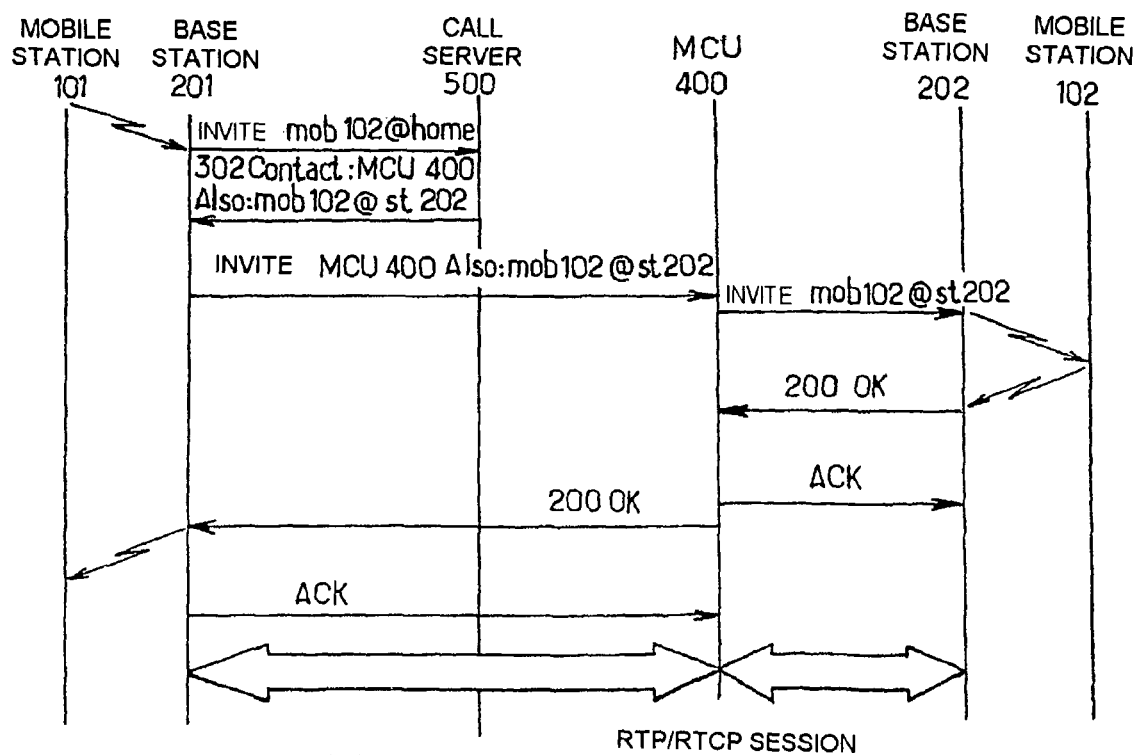
FIG. 2 is a chart presenting a set up protocol for establishing an individual communication involving two base stations of a system according to FIG. 1.

The chart of FIG. 2 presents a procedure for setting up an individual communication between the mobile station 101 and the mobile station 102 (here on the initiative of the mobile station 101), which uses an application layer signaling protocol such as the SIP protocol (M. Handley et al., "SIP: Session Initiation Protocol", RFC 2543, IETF, March 1999).

The SIP addresses are similar to electronic messaging addresses, that is they are of the form "user@host", where the "user" field designates for example a user name or a telephone number, and where the "host" field designates for example a domain name or an address in numerical form. The SIP protocol provides for schemes, in particular schemes called INVITE and ACK, used to initialize a call session between two SIP users. The responses to the messages sent within the framework of these schemes are defined by classes of codes.

Thus, on request from the mobile station 101, the base station 201 generates an invitation message INVITE addressed to the call server 500. This INVITE message mentions as destination the mobile station 102, whose SIP address is for example "mob102@home", where "mob102" is the user name of the mobile station 102 and where "home" is the address of a nominal location register called the HLR (standing for "Home Location Register") which accommodates the location database 600.

In the example represented, the call server 500 responds, after consulting the location database 600, with a message indicating a code "302" which signifies that the mobile station is momentarily under the coverage of another base station (the code 302 signifies "Moved temporarily"). This message indicates moreover in a "Contact" field the address of the MCU processing the communication (here the MCU designated by the address "MCU 400") and, in an "Also" field, the SIP address of the mobile station 102 under the coverage of the base station 202 (whose address is "st202" in the example).

The base station 201, in accordance with the SIP protocol, repeats its INVITE message, this time addressing it to the MCU 400, and moreover mentioning in the "Also" field the address "mob102@st202" of the mobile station 102 under the coverage of the base station 202.

The MCU 400 then sends an INVITE message destined for the base station 202, mentioning as party to the call the mobile station 102 designated by its address "mob102@st202".

When the mobile station 102 has taken the call, the base station 202 sends as a response to the MCU a validation message (code "200 OK") which is acknowledged by the MCU 400 with the aid of an acknowledge message ACK.

The MCU 400 then sends the base station 201 a validation message "200 OK", which is acknowledged by an acknowledge message ACK. The communication is then set up, for example in the form of an RTP/RTCP session, and conversation can then commence.

Figure 3:
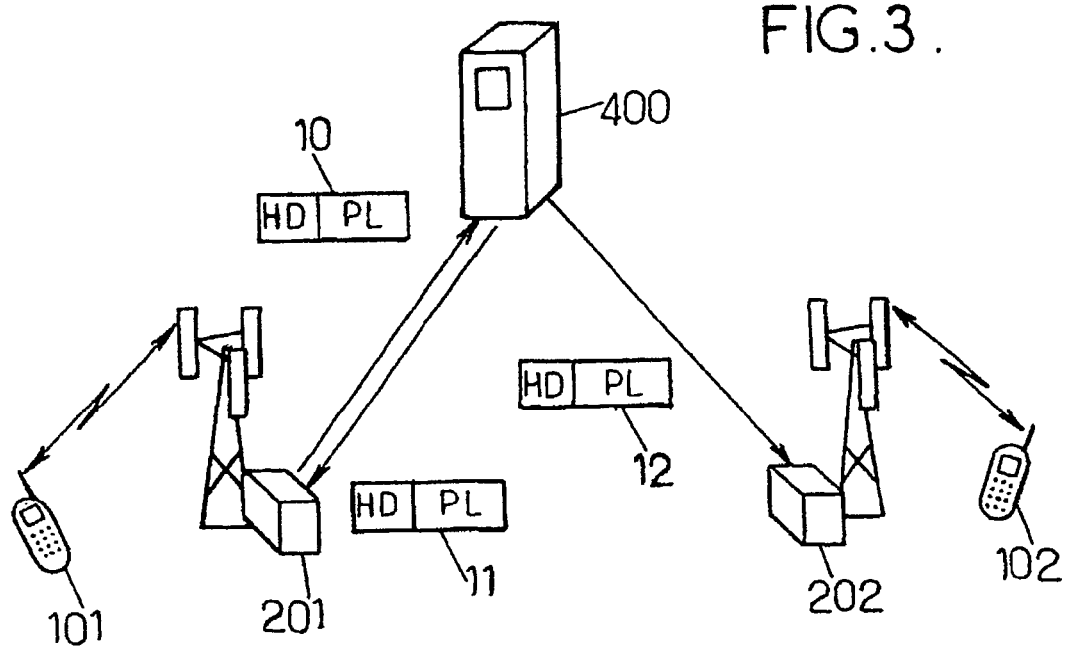
FIG. 3 is a diagram illustrating the topology of an RTP/RTCP session in the case of an individual communication.

FIG. 3 gives the topology of the RTP/RTCP session for the individual communication initialized according to the procedure described hereinabove with regard to FIG. 2. The RTP packets 10 received by the MCU 400 of the base station 201 are retransmitted to the base stations 201 and 202, after possible processing, in the form of RTP packets 11 and 12. Moreover, RTCP packets (not represented) are transmitted in response to the transmission of the RTP packets so as to ensure the control of the transport service.

The setting up of a group communication between more than two mobile stations may naturally be based on an adaptation of the SIP protocol. The initialization of a group communication between the mobile stations 101, 102 and 103 which are under the coverage of the base stations 201, 202 and 203 respectively, is illustrated by the chart of FIG. 4. The RTP/RTCP session is here set up on the initiative of the mobile station 101.

In such a case, several "Also" fields, followed by the respective SIP addresses of all the mobile stations party to the group communication processed by the MCU 400 (here the addresses "mob102@st202" and "mob103@st203" of the mobile stations 102 and 103 respectively, are included in the INVITE messages transmitted by the base station 201 to the call server 500 or to the MCU 400. The MCU 400 then transmits an INVITE message destined for each of the other base stations 202 and 203 which are party to the group communication.

In this case, moreover, each of the INVITE messages comprises additionally, in the body of the message, a description of the RTP/RTCP session in accordance with the SDP protocol (M. Handley et al., "SDP: Session Description Protocol", RFC 2327, IETF, April 1998). This description is for example denoted "Ses1" in the chart of FIG. 4. The use of this description allows the exchange of information between the equipments participating in the group communication, on the choice of the UDP ports, that is of the ports of the equipments used by the UDP protocol (J. Postel, "User Datagram Protocol", RFC 768, IETF, August 1980), which have to be used for the setting up of the RTP/RTCP sessions, as well as on the nature of the profile of the data exchanged in the course of the session (audio or video, type of coding, sampling frequency, etc). It will be noted that, in the "Also" field of the response message transmitted by the call server 500 to the base station 201 that dispatched the first INVITE message, the call server 500 can also propose an identifier of the mobile stations corresponding, for example, to a temporary number acquired during registration.

Figure 5:
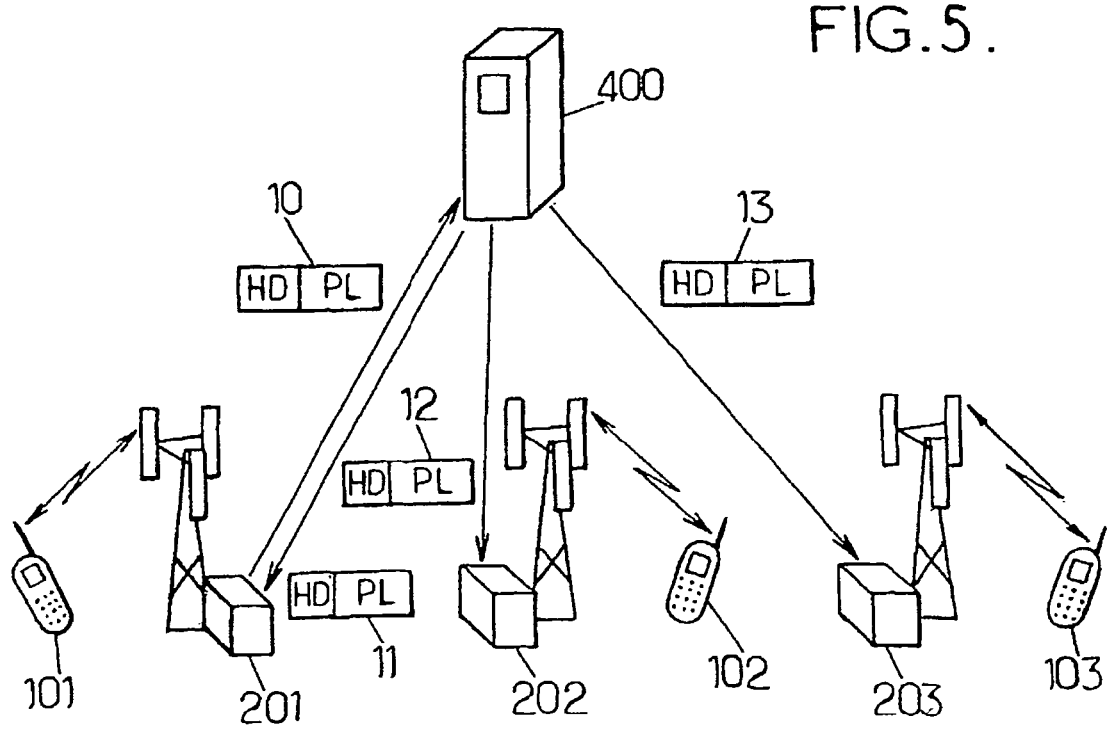
FIG. 5 is a diagram illustrating the topology of an RTP/RTCP session in the case of the group communication.

Represented in FIG. 5 is the topology of the RTP/RTCP session for the group communication initialized according to the procedure described hereinabove with regard to the chart of FIG. 4. The RTP packets 10 received by the MCU 400 from the base station 201 are retransmitted to base stations 201, 202 and 203, after possible processing, in the form of RTP packets 11, 12 and 13 respectively. For the sake of clarity, the RTCP packets which are transmitted in response to the transmission of the RTP packets, are not represented.

The conventional audio profiles defined in RFC 1889 mentioned above do not make it possible to process certain particular operations of private systems for professional radio-communications, such as the management of alternation in half-duplex mode communications. This is why the invention proposes an adaptation of RTP allowing management of alternation in an individual or group communication in half-duplex mode.

As is represented in the diagrams of FIG. 3 and FIG. 5, the RTP packets comprise a header HD, and a body of data PL containing the payload, that is the audio or video data.

The chart of FIG. 6 represents the format of the header of a packet according to the RTP protocol (see RFC 1889, mentioned above). This header comprises the following fields:

- a V ("Version") field, whose length is equal to two bits, which contains a version number of the protocol (V=2 in the case represented);
- a P ("Padding") bit, which indicates, when it has the logic value 1, the presence of complementary bytes at the end of the RTP packet. These complementary bytes make it possible to obtain a length exhibiting certain characteristics, for example for cryptography purposes;
- an X ("Extension") bit which indicates when it has the logic value 1, the presence of an extension header;
- a CC ("CSRC Count") field, with a length equal to four bits, the value of which defines the number of identifiers of CSRC type ("Contributing Source Identifiers", see later) following the fixed header.
- an M ("Marker") bit, which is a marking bit defined by the profile, that is that can be used as a function of the requirements of the application;
- a PT ("Payload Type") field, with a length equal to seven bits, which identifies the type of the payload (audio or video). This field contains a value which is either a number registered with the IANA ("Internet Assigned Numbers Authority"), or a number chosen dynamically from a list of usable values and whose significance can be chosen by the equipments that are party to the communication.
- a sequence number, the length of which is equal to 16 bits, which is initialized with a random value at the start of sending of an RTP packet stream by an end equipment, and which is incremented by one unit for each packet dispatched. This number allows the other end equipment or other end equipments of the RTP session to reorder the packets or to detect the missing packets in case of loss of RTP packets during their transport through the IP network;
- a timestamp, the length of which is equal to 32 bits, and which dates the instant of generation of the payload of each of the packets. This stamp thus allows the end equipments to calculate the fluctuations in the transport time through the network and thus, to plan the buffer memories necessary for guaranteeing optimal service quality. The timestamp is obtained from a clock whose resolution is sufficient to allow synchronization and calculation of jitter. The initial value of the timestamp is determined randomly, as for the sequence number;
- an SSRC synchronization source identifier, the length of which is equal to 32 bits, and which designates the source of the synchronization of the RTP packets. This source may be the end equipment which generates the RTP packet, but it may also be an intermediate device of the network called a mixing entity (or mixer), which creates a new stream of RTP packets from RTP packets received from the sources proper, after having modified the synchronization thereof. In the latter case, the SSRC identifier designates the mixing entity;
- a variable length field, containing a list of CSRC contributing source identifiers, each coded on 32 bits, the number thereof being indicated in the CC field mentioned above (there may be between 0 and 15 such codes in the list). These contributing sources are the end equipments that generate the payload of the RTP packet. The CSRC codes are inserted by the mixing equipments, on the basis of the SSRC codes of the contributing sources.

The first twelve bytes are present in all the RTP packets, while the list of CSRC identifiers is present only if it is inserted by one or more mixing entities.

For a payload consisting of voice-coding data, the format of the payload of an RTP packet complies with the diagram of FIG. 7. The useful data of the RTP packet correspond to the following fields:

- an NF ("Number of Frames") field, coded on two bits, which contains a value on the basis of which is determined the number of speech frames that are contained in the RTP packet;
- a C ("Encrypted") bit, which is set to the logic value 1 when information relating to encryption (comprising an algorithm identifier and a key identifier, see later) are contained in the RTP packet;
- a P ("Protected") bit, which indicates that the frames are protected;
- an E ("Emergency") bit, which, when it is set to the logic value 1, makes it possible to ensure specific processing at the level of the end equipment which receives the RTP packet;
- a PRIO ("Priority") field, the length of which is equal to three bits, which indicates a priority level associated with the speech frames contained in the RTP packet;
- a source address, coded on 24 bits, which identifies the source address of the user (that is here the mobile station) which sends the speech frames contained in the RTP packet, it being observed that the CSRC contributing source code identifies the end equipment (that is here the base station) that generates the RTP packet and not this user;
- a field containing, as the case may be, the speech frames contained in the RTP packet ("codec Frames"). The number of such frames depends on the value of the NF field (see above). The length of this field is equal to 88 bits (11 bytes). Each frame is aligned with padding bits set to the logic value 0, if necessary. Furthermore, the complete field is aligned with padding bits, if necessary. In one example when the speech frames are coded on 11 bytes, the total length of the field is equal to 0 bytes if NF=0, to 12 bytes if NF=1 (with one padding byte), to 24 bytes if NF=2 (with two padding bytes), or to 36 bytes if NF=3 (with three padding bytes);
- as the case may be, an algorithm identifier ("Algorithm ID"), coded on eight bits, which identifies the encryption algorithm implemented for the data encryption; and,
- as the case may be, an encryption key identifier ("Key ID"), coded on 24 bits, which contains the value of an encryption key used by the encryption algorithm.

It will be noted that the algorithm identifier and the key identifier are contained in the RTP packet only if the bit C has the logic value 1. Additionally, fields other than those described above may be contained in the RTP packet. These fields contributing nothing to the understanding of the invention, they are neither represented in FIG. 7, nor made explicit in the present description.

As will have been understood, RTP packets may be transmitted with no payload, when the value contained in the NF field is 0 (NF=0). One then speaks of "empty" packets since they contain no speech frame.

The method according to the invention will now be described with reference to the flowcharts of FIGS. 8 and 9, in the case of a group communication between three mobile stations.

It is recalled that according to the invention, the base stations are at one and the same time equipments of the radio subsystem of the radiocommunications system (which undertake the radio interface with the mobile stations), and end equipments of the transport network 300, which send and receive RTP packets.

Accordingly, let us consider the configuration represented in FIG. 1, where the mobile station 101 is under the coverage of the base station 201, the mobile station 102 is under the coverage of the base station 202 and the mobile station 103 under the coverage of the base station 203.

Furthermore, let us assume that the mobile stations 101, 102 and 103 are party to a group communication in half-duplex mode, set up according to the SIP session initialization protocol illustrated by the chart of FIG. 4.

More particularly, let us assume for example that the mobile station 101 has the right to send for the alternation in progress and is currently sending. The speech frames sent by the mobile station 101 over the radio channel are picked up by the base station 201. From there, they are transmitted to the MCU 400, through the IP network, in RTP packets. The MCU transmits these RTP packets to the base stations 201, 202 and 203. These RTP packets contain the CSRC code of the base station 201, which is the source selected by the MCU to control the alternation in progress. The base stations 202 and 203 transmit them in their turn, by way of respective radio channels, to the mobile stations 102 and 103 respectively.

The MCU 400, as central equipment, performs an arbitration in case of conflict between requests for the right to send originating from various mobile stations by way of the corresponding base stations, and notifies the various base stations of the result of this arbitration. It must also be able to warn without delay the mobile stations in reception phase of the end of the alternation in progress, which corresponds to the cessation of the sending of speech frames by the mobile station that had obtained the right to send for the alternation in progress. In this way, these mobile stations in reception phase have the possibility of requesting the tight to send.

To do this, the invention proposes that an indication element, included in the RTP packets, fulfil a certain number of functions in respect of management of alternation.

In one example, the indication element may have as function, in combination with the CSRC code, to indicate to the base station selected by the MCU that the right to send has been granted to it. In one example, the indication element actually has this function when it is present, with a first given value, in the RTP packets sent by the MCU to the base stations 201, 202 and 203.

Moreover, according to the invention, the indication element also has as function, when it is present with a second given value, in the RTP frames transmitted to the MCU from the base station having the right to send (i.e., that whose CSRC code is indicated in the RTP packets transmitted by the MCU) to indicate to the MCU, on the one hand that said base station acknowledges receipt of the right to send which has been granted to it by the MCU, and on the other hand that it is requesting maintenance of this right to send.

Moreover, the indication element furthermore has as function when it is present, with a third given value, in an RTP packet transmitted by the MCU to the base stations, to indicate to the base stations that they may request the right to send. The one among them that will be selected by the MCU will then take control of the next alternation.

Preferably, the indication element finally has as function, when it is present with a fourth given value in an empty RTP packet which is transmitted to the MCU from the base station having the right to send, to indicate to the MCU that said base station relinquishes its right to send. This occurs when the alternation in progress has terminated, that is when the mobile station which had obtained the right to send for the alternation in progress, ceases sending speech frames.

These functions of the indication element will be more clearly apparent on reading an exemplary embodiment of the invention which follows. In one example, the first and the second given values of the indication element are identical. Likewise, the third and the fourth given values of the indication element are identical, and different from the first and second values.

Specifically, the indication element may be a field of any length, which codes the aforesaid given values. In a preferred embodiment, this indication element may advantageously be reduced to a bit, since it possesses two distinct functions when it is present in an RTP packet transmitted to the base stations from the MCU (as a function of its value out of said first and said third different given values), and two distinct functions when it is present in an RTP packet transmitted from a base station to the MCU (here again as a function of its value out of said second and said third different given values).

In a preferred embodiment, it is proposed to use for this purpose the M bit of the header of the RTP packets in conjunction with the fundamental mechanisms of operation of the MCU as RTP mixing entity. Said first value and said second value of the indication element are then, for example, the logic value 1, while said third and said fourth given values are the logic value 0.

Figure 8:
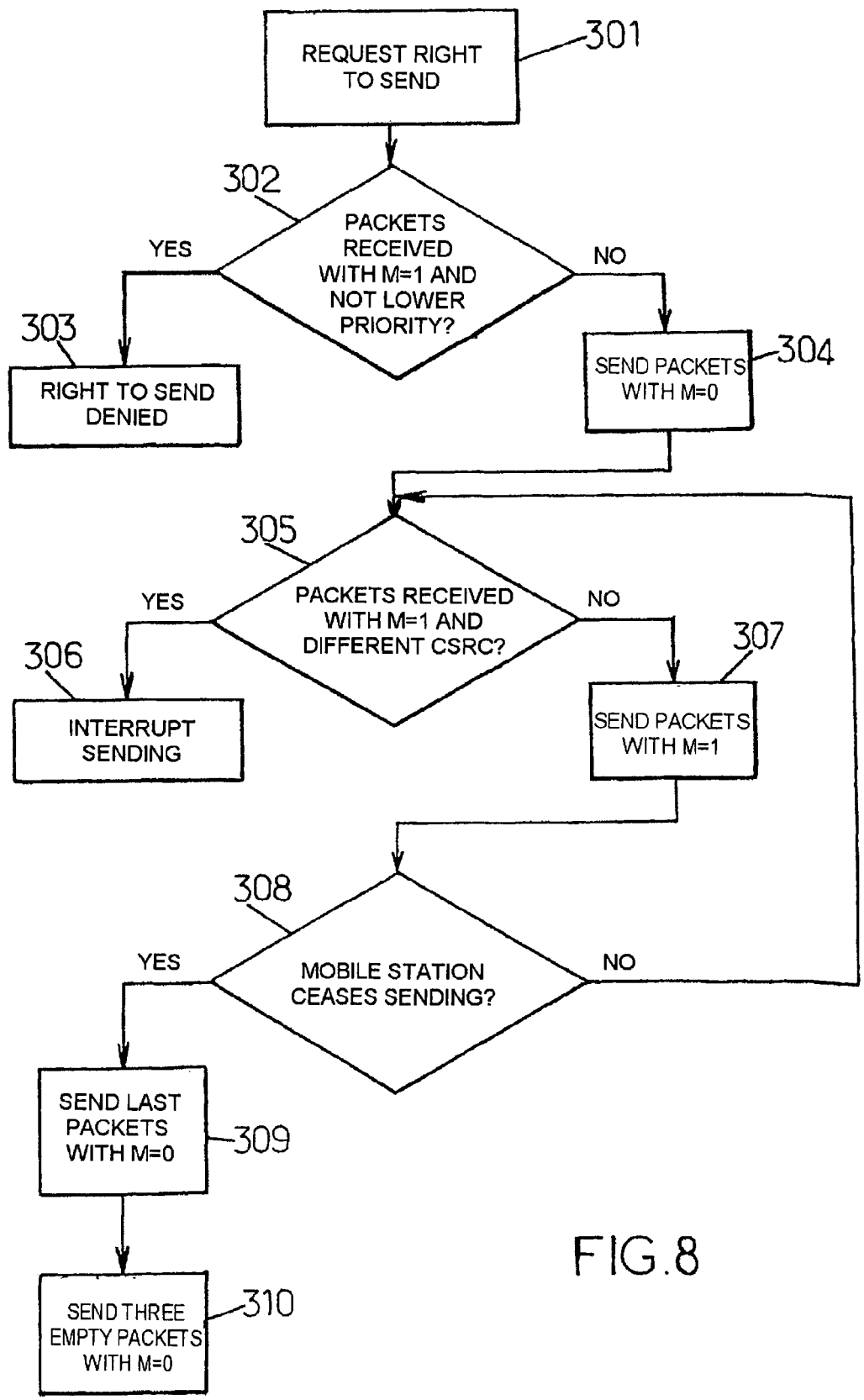
FIG. 8 is a flowchart illustrating steps of the method of operation of a base station comprising means for the implementation of the method according to the invention as end equipment.

The flowchart of FIG. 8 illustrates the manner of operation of a base station as end equipment according to the invention. The example of the base station 201 is considered more particularly.

Let us assume that, in a step 301, the mobile station 101 manifests its intention to transmit by an appropriate signaling to the base station 201. In practice, this occurs when the user of the mobile station 101 presses the PTT button (standing for "Push-To-Talk") and speaks into the microphone of the mobile station.

If the base station 201 is already receiving from the MCU, through the IP network, RTP packets with M=1 (thereby signifying that the right to send has already been granted by the MCU to another base station which is sending RTP packets which are those retransmitted by the MCU with M=1), and if the priority associated with the alternation in progress is not lower than the priority associated with the request from the mobile station 201, then, in a step 302, it deduces therefrom that the right to send should be denied to the mobile station 101. Stated otherwise, the base station 201 decides that the mobile station 101 cannot take control of the alternation. In a step 303, the base station 201 then notifies the mobile station 101 that it has been denied the right to send. In practice, this is indicated to the user by the turning off of an indicator light of the mobile station 101 which had been lit in step 301. The base station 201 continues to send over the air interface the speech frames received in the packets received from the MCU and the mobile station 101 remains in reception phase. It will be noted that the priority associated to the request from the mobile station 101, can be transmitted by the aforesaid signaling or be calculated by the base station 201 according to an ad-hoc scheme. Furthermore, the priority associated with the alternation in progress is indicated in the RTP packets received by the base station 201 (in the aforesaid PRIO field).

If, this is not the case, either because the base station 201 is not receiving any RTP packet from the MCU, or because the priority associated with the request from the mobile station 101 is higher than that associated with the alternation in progress, then, in step 302, the base station 201 deduces therefrom that it can grant (at least provisionally) the right to send to the mobile station 101 which has commenced sending speech frames. The base station 201 therefore commences, in a step 304, sending RTP packets containing these speech frames, with an M bit equal to the logic value 0 (M=Q). This value has as function to indicate to the MCU that the base station 201 is requesting the right to send.

Thereupon the base station 201 commences receiving (or continues to receive) RTP packets with M=1. As indicated above, these packets contain an SSRC synchronization source identifier, which corresponds to the identifier of the MCU and a CSRC contributing source identifier, which corresponds to the identifier of the base station which has the right to send for the alternation in progress.

If the CSRC identifier is different from the identifier of the base station 201, the latter deduces therefrom, in a step 305, that it has not been selected by the MCU, that is that the right to send has not been granted to it by the MCU, or, stated otherwise, that control of the alternation has been granted by the MCU to another base station. In this case, in a step 306, it interrupts the sending of RTP packets to the MCU and notifies the mobile station 101 that it does not have the right to send. Step 306 is equivalent to the aforesaid step 303.

If, conversely the CSRC identifier of the RTP packets transmitted by the MCU is that of the base station 201, the latter deduces therefrom, in step 305, that it can continue the sending to the MCU of the RTP packets containing the speech frames sent by the mobile station 101 over the radio channel. However, in a step 307, it henceforth sends these RTP packets with the M bit set to the logic value 1 (M=1), in such a way as to indicate to the MCU that it acknowledges receipt of the right to send that has been granted to it by the MCU, and to indicate that it is requesting maintenance of this right to send.

At any moment, the mobile station 101 can cease sending speech frames over the radio channel linking it to the base station 201, if the user releases the PTT button. This event is monitored by the base station 201 in a step 308. If the mobile station 101 continues to send speech frames, RTP packets containing these frames are generated by the base station 201 and sent to the MCU. The method continues by repeating the aforesaid step 305. If, conversely, the mobile station ceases sending speech frames, then, in a step 309, the base station sends, to the MCU, last RTP packets with the M bit set to the logic value 0. These last packets contain the last speech frames sent by the mobile station 101 (and retarded by passing through a buffer memory of the base station). The M bit with the logic value 0 then has as function to indicate to the MCU that the base station 201 is relinquishing its right to send. In this way, the MCU is informed of the next cessation of the sending of RTP packets by the base station 201 even before these last packets are sent. The MCU, as will become apparent later in regard to FIG. 9, can then alert the other base stations by transmitting these last RTP packets with the M bit set to the logic value 0 to indicate that the end of the alternation in progress is near, and that it will soon be able to request (and, for one of them, obtain) the right to send.

Finally, when the base station 201 has sent the last speech frames in RTP packets with the M bit set to 0 (step 309), it sends, in a step 310, a certain number (for example three) of empty RTP packets, that is ones with no payload, and whose M bit is at the logic value 0. It sends several such packets so as to minimize the risks of nonreceipt by the MCU, which may occur if the network loses packets because of the overloading of the routers. It is recalled that empty packets are characterized by an NF field containing the value 0. These empty packets have as function to actually signal the end of the alternation in progress. They make it possible for the MCU not to confuse the end of the alternation in progress with a request for the right to send that originated from another mobile station situated under the coverage of the same base station 201 as the mobile station 101 which controls the alternation in progress. Indeed, such a request would also have the form of RTP packets containing speech frames (those sent by this other mobile station and received by the base station 201 via another radio channel), whose M bit would also have the logic value 0, and whose CSRC field would contain the same source identifier (that of the base station 201, which would be the same source seen by the MCU).

Figure 9:
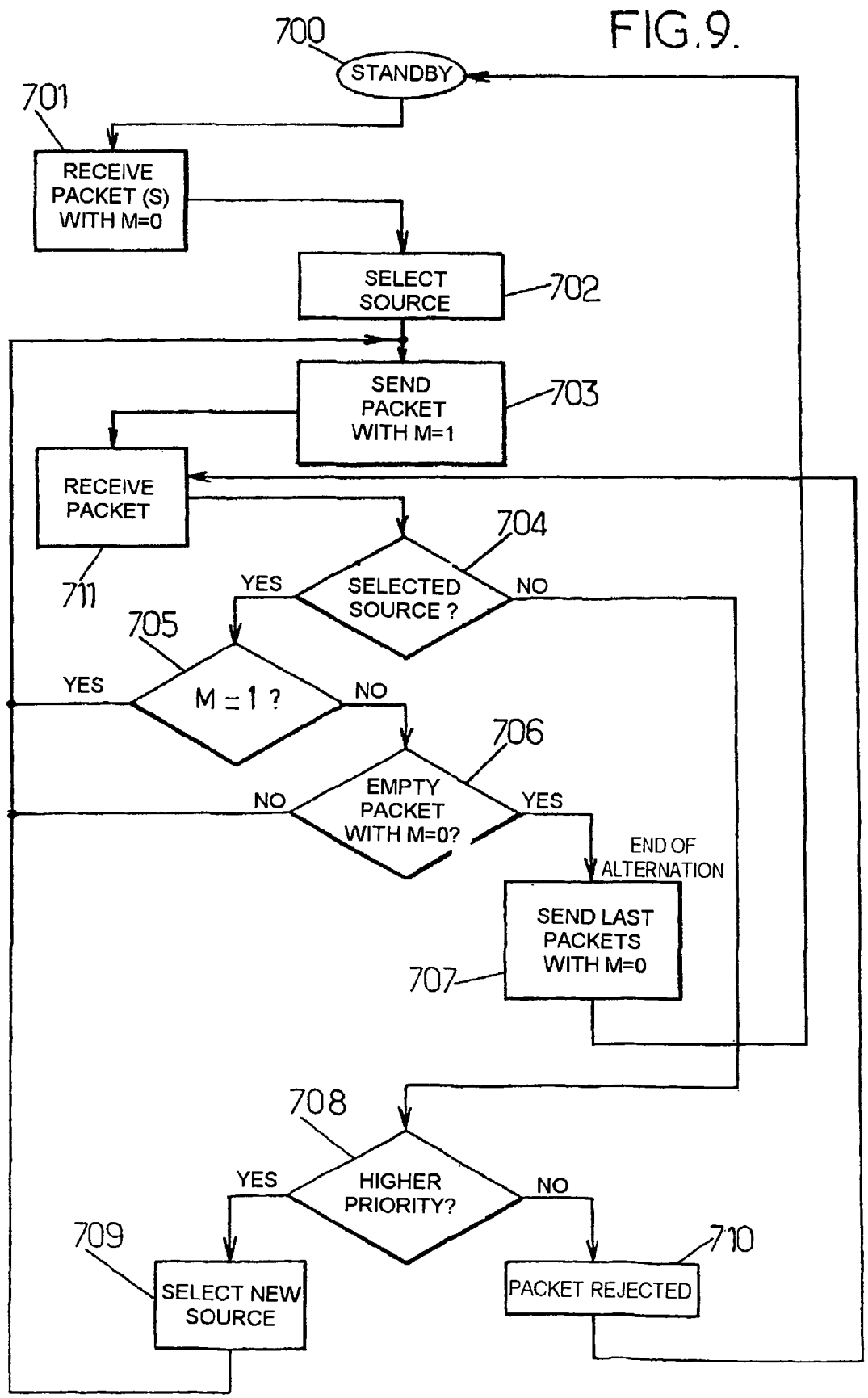
FIG. 9 is a flowchart illustrating steps of the operation of a multimedia video conferencing equipment (MCU) for the implementation of a method according to the invention as central equipment.

The flowchart of FIG. 9 illustrates the manner of operation of the MCU as central equipment according to the invention.

The MCU is initially in a standby state 700, wherein it receives no RTP packet (it is assumed that all the participants in the group conversation are silent). It is recalled that, when a base station requests the right to send, it sends RTP packets to the MCU, these packets containing speech frames (non-empty packets) with the M bit at the logic value 0 (M=0).

Let us assume that at least one and perhaps several base stations (also called sources) send non-empty RTP packets such as these with M=0. When, in a step 701, the MCU receives these packets it selects, in a step 702, one of the base stations according to an ad-hoc selection algorithm. When a single source is sending RTP packets, this algorithm selects this source. When several sources are sending RTP packets simultaneously, the selection algorithm may bring in, for example, the priority, the identity of the sender or any other criterion.

Once the selection has been made, the MCU, in a step 703, transmits to all the base stations participating in the group communication (namely, in the example, the base stations 201, 202 and 203) the RTP packets received from the selected base station (namely, in the example, base station 201), after having set the M bit to the logic value 1 and having placed its own identifier in the SSRC field and that of the selected source in the CSRC field (the value of the CC field of the RTP packet is then equal to 1).

When, in a step 711, the MCU then receives a new RTP packet, the MCU firstly verifies, in a step 704, that this packet does indeed originate from the selected source. For this purpose the CSRC identifier of the packet is used.

If this is the case, then the MCU verifies, in a step 705, whether the base station is requesting maintenance of its right to send. This is the case if the RTP packet has an M bit with the logic value 1. If so, this packet is transmitted as indicated above (return to step 703 above). If on the other hand the M bit has the logic value 0, then, in a step 706, the MCU verifies whether it is dealing with an empty packet. If the packet is empty (that is if it contains no speech frame), this is because the source indicates the end of the alternation. Then, in a step 707, the last RTP packets (those which remain in the buffer memory of the MCU) are transmitted as indicated above (with reference to step 703 above) but with the M bit set to the logic value 0, so as to indicate the end of the alternation to the base stations. The MCU thereafter returns to its standby state 700. If on the other hand the packet is not empty (that is it contains at least one speech frame), the RTP packet is sent with the M bit in the logic state 1 (we return to step 703).

If, contrary to the assumption made above in respect of the test of step 704, the RTP packet received in step 711 does not originate from the selected source, two cases may arise. They are examined in a step 708. If the priority of the source of the RTP packet received is higher than that of the source selected, then, in a step 709, the source of the RTP packet received is selected as new selected source. The RTP packet received is then transmitted, by going back to step 703 with, in the CSRC field, the identifier of the new selected source. In the converse case, the packet is rejected outright, in a step 710, and the MCU waits for the receipt of a new packet (return to step 711).

Referring to FIG. 8, it may be seen that when, in step 709, the MCU selects a new source although a source is already currently sending RTP packets, the test of step 305 is satisfied for this last source, so that it ceases sending to RTP packets over the IP network and causes the sending of speech frames by the mobile station concerned to cease.

It may also be seen that as soon as a base station receives RTP packets with the M bit at the logic value 0 (indicating the next end of the alternation in progress) it is ready to accept a send request from a mobile station since the test of step 302 will not be satisfied, so that, in step 304, the base station will send RTP packets with the M bit set to the logic value 0.

The technique presented hereinabove therefore makes it possible both to undertake arbitration of requests for alternation by the base stations, preemption of the communication when the right to send is requested by a base station with a higher priority, and anticipation of the end of the alternation in progress, so as to prepare the following alternation as soon as the end of the alternation in progress is announced by the sending by the selected base station of empty RTP packets with the M bit set to the logic value 0.

A variant of the technique presented hereinabove makes it possible to speed up the detection of the end of the alternation in progress without risk of false detection in case of loss of RTP packets. The test of step 706 which reads "Packet empty with M=0?", may be replaced with the following test: "(Packet empty with M=0) or (packet with M=0, the previous three packets not having all been lost)?". Thus, the MCU detects the end of the alternation in progress upon receipt of the first packet with the M bit set to the logic value 0 and the MCU cannot confuse a start of alternation with the end of the alternation in progress since, if the three empty packets with M=0 sent by the base station at the end of alternation have been lost, a nonempty packet with M=0 will not be regarded as indicating the end of the alternation in progress. The terms "previous" and "first" employed hereinabove refer of course to the order of the RTP packets as indicated by the sequence number contained in the header of the RTP packets (see FIG. 6).

As will not have escaped the person skilled in the art, the manner of operation described by the flowcharts of FIGS. 8 and 9 may require guard retardations in order for the equipments of the IP network, namely the end equipments (base stations) and the central equipment (MCU), to be protected against dropouts of links, whether the latter have a physical origin or stem from a failure or from an overload of the routers.

Figure 10:
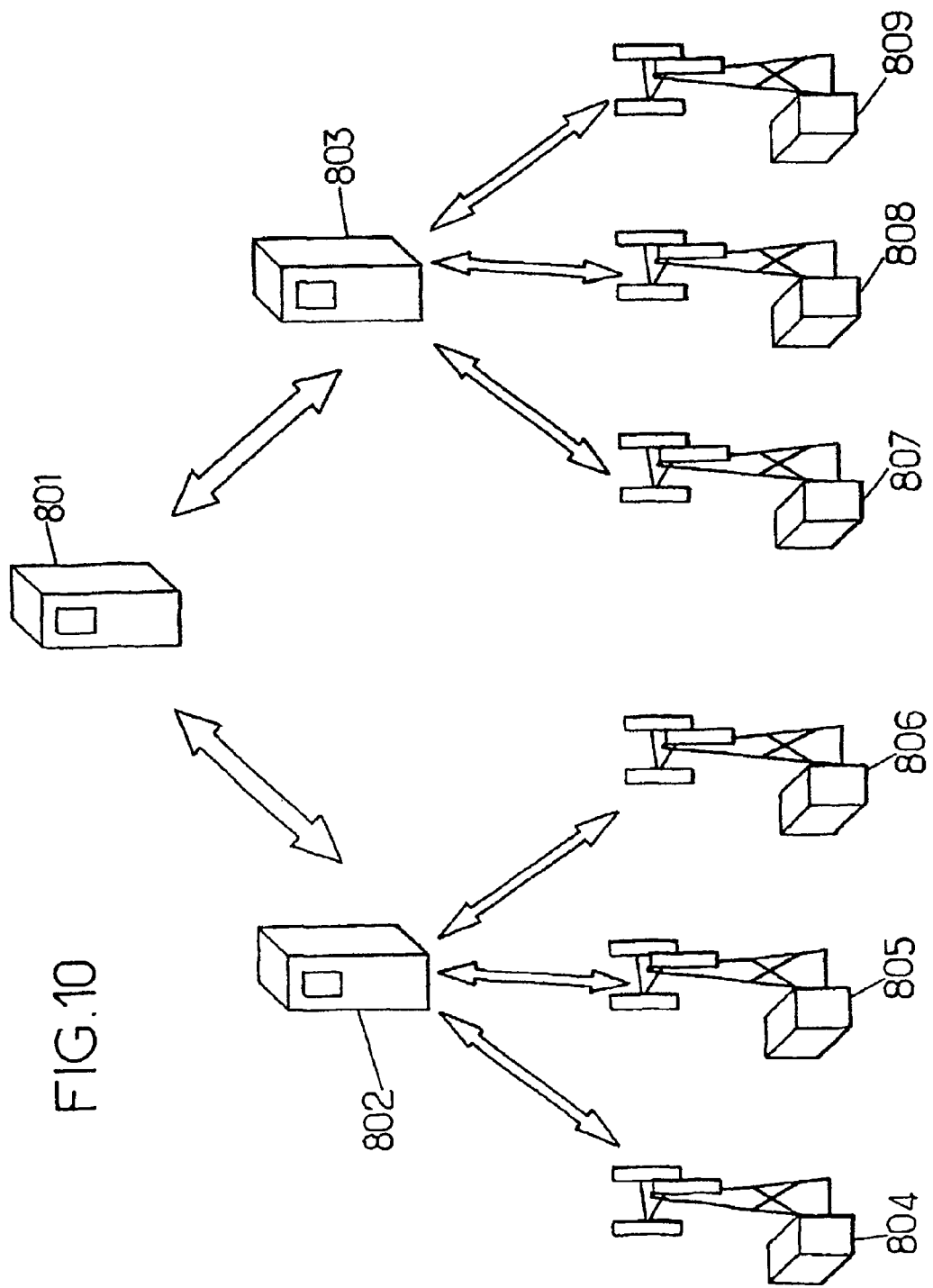
FIG. 10 is a diagram illustrating the topology of an RTP/RTCP session in the case of a group communication involving several levels of MCU.

The technique presented hereinabove may effortlessly be extended to more complex multimedia conferencing topologies than that presented hereinabove by way of example, and in particular to a topology such as represented in FIG. 10. In this topology, an MCU 801 (or master MCU) undertakes the attaching and arbitration of the alternations between sub-conferences managed by the MCUs 802 and 803 (or slave MCUs), the latter actually performing the arbitration of the alternation and the attaching of the base stations 804 to 806, and 807 to 809 respectively. The person skilled in the art will realize that the operational flowcharts for the base stations and for the master MCU are identical to those presented previously with regard to FIGS. 8 and 9 respectively, while the manner of operation of the slave MCUs 802 or 803 complies with the flowchart of FIG. 8 as regards their link with the master MCU 801, and with that of FIG. 9 as regards its links with the base stations 804-806 or 807-809 respectively.

Thus, to give a simple example, at the start of an alternation the slave MCU 802 sends the RTP packets received from a base station such as 804 with the M bit at the logic value 0, leaving the M bit at the logic value 0 for the RTP packets transmitted to the master MCU, while the M bit is set to the logic value 1 for the RTP packets retransmitted to the various base stations 804 to 806 participating in the communication.

The invention has been described hereinabove in a preferred but nonlimiting embodiment. The person skilled in the art will appreciate that variant embodiments may be envisaged without departing from the principle of the invention.

In particular, the respective logic values of the marking bit M that are allotted to the various functions of this bit according to the invention, may naturally be inverted. Moreover, and in particular in the case where further functions have to be allotted to this indication element, it is possible to replace the marking bit M by a word of several bits, or to associate it with one or more other bits in such a way that the indication element may have more than two distinct values.

The invention claimed is:

1. A method for managing two-way alternate communication in half-duplex mode between at least two end equipments of a packet switching transport network in non connected mode, comprising setting an indication element, wherein the indication element is separate from voice frames, has as function, when it is present with a first given value in packets which comprise at least one voice frame each and are transmitted from one of said end equipments to a central equipment undertaking the management of the communication, to indicate to said central equipment, on the one hand, that said end equipment acknowledges receipt of the right to send voice frames that is granted to it by said central equipment and, on the other hand, that it is requesting the maintaining of this right to send, and has further as function, when it is present with a second given value in packets which comprise at least one of the last voice frames transmitted from said end equipment to said central equipment undertaking the management of the communication, to indicate to said central equipment that it is relinquishing its right to send;

wherein the packet switching transport network in non connected mode is an IP (Internet Protocol) network;

wherein the packets transmitted over the network are RTP (Real time Transport Protocol) packets, the communication being set up as an RTP/RTCP (Real time Transport Control Protocol) session; and wherein the indication element is the marking bit of the header of the RTP packets, said first value of the indication element being the logic value 1 or 0, and said second value of the indication element being the inverse logic value 0 or 1, respectively, of said first value of the indication element.

2. The method of claim 1, wherein said indication element has further as function, when it is present with the second given value in packets transmitted by said central equipment to said end equipments, to indicate to said end equipments that the alternation in progress has terminated.

3. The method of claim 1, wherein said indication element has further as function, when it is present with the second given value in at least one empty packet transmitted to said central equipment from an end equipment having the right to send, to indicate to said central equipment that the alternation in progress has terminated.

4. The method of claim 1, wherein said indication element has further as function, when it is present with the second given value in at least one packet transmitted to said central equipment from an end equipment having the right to send, to indicate to said central equipment, when a given number of previous packets has not all been lost by the network, that the alternation in progress has terminated.

5. The method of claim 1, wherein said central equipment retransmits, to said end equipments, the packets received from said end equipment having the right to send and containing the indication element with said first given value as long as said central equipment maintains the right to send granted to said end equipment.

6. The method of claim 1, wherein the RTP/RTCP session is initiated according to the session initiation protocol SIP.

7. The method of claim 1, wherein the communication is an individual communication or a group communication between mobile stations of a radiocommunications system, and wherein at least some of said end equipments of the packet switching transport network in non connected mode are base stations of said radiocommunications system.

8. A radiocommunications system comprising, on the one hand, mobile stations, and, on the other hand, base stations and at least one network equipment that are linked by a packet switching transport network in non connected mode, wherein said network equipment comprises means of management of a two-way alternate communication in half-duplex mode between at least two mobile stations, and wherein each of said base stations comprises means for setting an indication element separate from voice frames with a first given value in packets which comprise at least one voice frame each and are transmitted from said base station to said network equipment, to indicate to said network equipment, on the one hand, that said base station acknowledges receipt of the right to send voice frames that is granted to said base station by said network equipment and, on the other hand, that said base station is requesting the maintaining of this right to send, and means for setting the indication element with a second given value in packets which comprise at least one of the last voice frames transmitted from said base station to said network equipment, to indicate to said network equipment that said base station is relinquishing its right to send;

wherein the packet switching transport network in non connected mode is an IP (Internet Protocol) network;

wherein the packets transmitted over the network are RTP (Real time Transport Protocol) packets, the communication being set up as an RTP/RTCP (Real time Transport Control Protocol) session; and wherein the indication element is the marking bit of the header of the RTP packets, said first value of the indication element being the logic value 1 or 0, and said second value of the indication element being the inverse logic value 0 or 1, respectively, of said first value of the indication element.

9. The system of claim 8, wherein the network equipment comprises means for setting the indication element with the second given value in packets transmitted by the network equipment to the base stations, to indicate to said base stations that the alternation in progress has terminated.

10. The system of claim 8, wherein said indication element further has as function, when it is present with the second given value in at least one empty packet transmitted to the network equipment from base station having the right to send, to indicate to said network equipment that the alternation in progress has terminated.

11. The system of claim 8, wherein the indication element further has as function, when it is set with the second given value in at least one packet transmitted to the network equipment from a base station having the right to send, to indicate to said network equipment, when a given number of previous packets have not all been lost by the network, that the alternation in progress has terminated.

12. The system of claim 8, wherein the network equipment further has means for retransmitting, to the base stations, the packets received from the base station having the right to send and containing the indication element with said first given value as long as it maintains the right to send granted to said base station.

13. The system of claim 8, wherein the RTP/RTCP session is initiated according to the session initiation protocol SIP.

14. The system of claim 8, wherein the network equipment is a multimedia video conferencing equipment.

15. In a radiocommunications system comprising, on the one hand, mobile stations, and, on the other hand, base stations and at least one network equipment that are linked by a packet switching transport network in non connected mode, a base station comprising:
- means for setting an indication element separate from voice frames with a given value in packets which comprise at least one voice frame each and are transmitted from it to said network equipment, to indicate to said network equipment, on the one hand, that it acknowledges receipt of the right to send voice frames that is granted to it by said network equipment and, on the other hand, that it is requesting the maintaining of this right to send; and,
- means for setting the indication element with a second given value in packets which comprise at least one of the last voice frames transmitted from it to said network equipment, to indicate to said network equipment that it is relinquishing its right to send;
- wherein the packet switching transport network in non connected mode is an IP (Internet Protocol) network;
- wherein the packets transmitted over the network are RTP (Real time Transport Protocol) packets, the communication being set up as an RTP/RTCP (Real time Transport Control Protocol) session; and
- wherein the indication element is the marking bit of the header of the RTP packets, said first value of the indication element being the logic value 1 or 0, and said second value of the indication element being the inverse logic value 0 or 1, respectively, of said first value of the indication element.

16. In a radiocommunications system comprising, on the one hand, mobile stations, and, on the other hand, base stations and at least one network equipment that are linked by a packet switching transport network in non connected mode, a network equipment comprising:
- means of management of a two-way alternate communication in half-duplex mode between at least two mobile stations through corresponding base stations, and
- means for setting an indication element separate from voice frames with a given value in packets which comprise at least one voice frame each and are transmitted by the network equipment to the base stations, to indicate to said base stations that the alternation in progress has terminated; and,
- means for receiving the indication element set with a second given value in packets which comprise at least one of the last voice frames transmitted from said base station to it, to indicate that said base station is relinquishing its right to send;
- wherein the packet switching transport network in non connected mode is an IP (Internet Protocol) network;
- wherein the packets transmitted over the network are RTP (Real time Transport Protocol) packets, the communication being set up as an RTP/RTCP (Real time Transport Control Protocol) session; and
- wherein the indication element is the marking bit of the header of the RTP packets, said first value of the indication element being the logic value 1 or 0, and said second value of the indication element being the inverse logic value 0 or 1, respectively, of said first value of the indication element.

17. In a radiocommunications system comprising, on the one hand, mobile stations, and, on the other hand, base stations and a multimedia video conferencing equipment that are linked by a packet switching transport network in non connected mode, a multimedia video conferencing equipment comprising:
- means of management of a two-way alternate communication in half-duplex mode between at least two mobile stations through corresponding base stations;
- means for setting an indication element separate from voice frames with a given value in packets which comprise at least one voice frame each and are transmitted by the multimedia video conferencing equipment to the base stations, to indicate to said base stations that the alternation in progress has terminated; and
- means for receiving the indication element set with a second given value in packets which comprise at least one of the last voice frames transmitted from said base station to it, to indicate that said base station is relinquishing its right to send;
- wherein the packet switching transport network in non connected mode is an IP (Internet Protocol) network;
- wherein the packets transmitted over the network are RTP (Real time Transport Protocol) packets, the communication being set up as an RTP/RTCP (Real time Transport Control Protocol) session; and
- wherein the indication element is the marking bit of the header of the RTP packets, said first value of the indication element being the logic value 1 or 0, and said second value of the indication element being the inverse logic value 0 or 1, respectively, of said first value of the indication element.

* * * * *